US00RE39853E

(19) United States
(12) Reissued Patent
Fier

(10) Patent Number: US RE39,853 E
(45) Date of Reissued Patent: Sep. 25, 2007

(54) BACKPACK WITH RETRACTABLE SHOULDER STRAPS

(76) Inventor: Alyx T. Fier, 5107 Greenwood No., Seattle, WA (US) 98103

(21) Appl. No.: 11/054,718

(22) Filed: Feb. 8, 2005

Related U.S. Patent Documents

Reissue of:
(64) Patent No.: 5,529,229
Issued: Jun. 25, 1996
Appl. No.: 08/290,389
Filed: Aug. 15, 1994

U.S. Applications:

(63) Continuation of application No. 08/048,218, filed on Apr. 20, 1993, now abandoned.

(51) Int. Cl.
*A45F 3/04* (2006.01)

(52) U.S. Cl. ..... 224/153; 224/579; 224/641; 224/643; 224/652

(58) Field of Classification Search ..... 224/578, 224/625
See application file for complete search history.

(56) References Cited

U.S. PATENT DOCUMENTS

| | | | | |
|---|---|---|---|---|
| 2,224,568 | A | * 12/1940 | Altorfer | 224/578 |
| 2,853,111 | A | 6/1958 | Williams | |
| 3,989,080 | A | 11/1976 | Koszegi | |
| 3,995,802 | A | 12/1976 | Johnston | |
| 4,018,369 | A | 4/1977 | Jaeger | |
| 4,237,341 | A | 12/1980 | Richards | |
| 4,318,502 | A | 3/1982 | Lowe et al. | |
| 4,332,379 | A | 6/1982 | Bannister | |
| 4,428,514 | A | 1/1984 | Elf | |
| 4,452,383 | A | 6/1984 | Marttinen | |
| 4,461,411 | A | 7/1984 | Harrow | |
| 4,515,300 | A | 5/1985 | Cohen | |
| 4,545,414 | A | 10/1985 | Baum | |
| 4,609,084 | A | 9/1986 | Thomas | |
| 4,883,207 | A | 11/1989 | McArthur | |
| 4,887,751 | A | 12/1989 | Lehman | |
| 4,901,897 | A | 2/1990 | Briggs et al. | |
| 4,961,522 | A | 10/1990 | Weber | |
| 5,025,965 | A | 6/1991 | Smith | |
| 5,114,059 | A | 5/1992 | Thatcher | |
| 5,169,043 | A | 12/1992 | Catania | |
| 5,184,763 | A | 2/1993 | Blaisdell et al. | |
| 5,205,451 | A | 4/1993 | Manzer | |
| 5,228,609 | A | 7/1993 | Gregory | |
| 5,341,973 | A | 8/1994 | Dawes et al. | |
| 5,427,290 | A | 6/1995 | Thatcher | |
| 5,487,498 | A | 1/1996 | Gleason | |
| 5,529,230 | A | 6/1996 | Smith | |
| 5,570,824 | A | 11/1996 | Lyon et al. | |

FOREIGN PATENT DOCUMENTS

| | | |
|---|---|---|
| CH | 124890 | 5/1928 |
| DE | 28583 | 5/1907 |
| FR | 495925 | * 7/1919 |
| GB | 518028 | 2/1940 |
| GB | 1238303 | 7/1971 |
| GB | 2197582 | 5/1988 |
| NO | 48086 | 6/1930 |

* cited by examiner

*Primary Examiner*—Nathan J. Newhouse
*Assistant Examiner*—Justin M. Larson
(74) *Attorney, Agent, or Firm*—Robert B. Hughes; Hughes Law Firm, PLLC

(57) ABSTRACT

A backpack having a waist encircling belt, and an attached set of shoulder straps which retract into a discreet pocket when not in use. There is a set of shoulder straps having clips on one end, and these are carried in, and attached to, a discreet pocket at the other end which is location on the outside, rear panel of the pack where the shoulder straps are readily accessible and can easily be drawn out and attached to rear side portions of the waist encircling belt. This provides additional support for the pack on an as-needed basis, and has the added benefit of being quickly and easily stowed when not in use.

20 Claims, 4 Drawing Sheets

60
62
12
66
64
68
70
58
68
10
24
56
30
50
72
32
36
48
20
40
16
22
14B
14A
54
52
46
18
42L
44
26
28L
38

BACKPACK WITH RETRACTABLE SHOULDER STRAPS

Matter enclosed in heavy brackets [ ] appears in the original patent but forms no part of this reissue specification; matter printed in italics indicates the additions made by reissue.

*REFERENCE TO RELATED PATENT APPLICATIONS*

*This is a continuation in part of U.S. patent application Ser. No. 08/048,218, filed Apr. 20, 1993, now abandoned.*

BACKGROUND OF THE INVENTION

1. Field of the Invention

This invention relates generally to the field of backpacks and particularly to small frameless fanny packs with waist encircling belts, and to a method of using the same.

2. Background Art

Small frameless backpacks or so called "day packs" have become widely popular with the general populace, and particularly with students and hikers, for carrying small loads. However, almost without exception these small packs lack any sort of load supporting waist encircling belt to help spread the load. This results in undue strain on the neck and shoulders. Additionally, when these day packs are used for active sports such as hiking or cycling, and because they are generally frameless and lie directly in contact with the wearer's back, they trap perspiration causing the wear's back to become wet and uncomfortable. Also, these day packs tend to restrict the wearer's range of motion in the upper body when executing sudden or difficult maneuvers. More recently small, waist encircling day packs without shoulder encircling straps, so called "fanny-packs" have gained in popularity due to their generally smaller size and less encumbering design. While these fanny packs offer greater freedom of movement, and avoid the perspiration problem they are less than ideal for carrying the heavier loads typical of day hiking. When heavily loaded the single waist encircling belt puts undue stress on the lumber region and the abdomen because the belt must be tightly cinched so that the bag doesn't slip down or tilt backwards. When engaged in vigorous exercise such as running, these fanny-packs also tend to bounce up and down and slip around to the front. This problem can be partially minimized by tightly cinching the waist belt, but additional strain is then put on the lumber and abdomen.

SUMMARY OF THE INVENTION

The back pack of the present invention retains the qualities which have made fanny-packs popular, namely their light compact design, but reduces the stress on the lumber and abdomen. This pack supports the load from the body in an especially effective manner and holds the pack, securely in to the body such that it always maintains the same center of gravity as the body. During certain sports such as alpine skiing or rock climbing this feature is particularly important and desirable.

To define the arrangement and function of the present invention, it is first necessary to present some background definitions. The backpack is arranged to carry a load on the back of a person's body, and the person's back is considered as having an upper back area and a lower back area. Further, the person's body is considered as having the following:

i. a lower back location at approximately the height of the person's waist;

ii. an upper back location approximately just below the height of the person's shoulders;

iii. an intermediate back location positioned generally at a juncture area of the upper and lower back areas about half way between the lower and upper back locations;

iv. right and left shoulder locations;

v. a waist location

The backpack comprises a carrying pouch defining a loud carrying area. The pouch has front and rear panel portions, side portions and top and bottom portions. There is a shoulder strap assembly which comprises:

i. a backstrap section;

ii. a shoulder strap section;

iii. a front strap section.

The back strap section has a lower end connecting at a central rear location of the pouch. The back strap section comprises right and left back strap portions which extend forwardly, upwardly and outwardly over the upper back area to the right and left shoulder locations to exert right and left force components directed from said lower end connection upwardly, outwardly and forwardly to the right and left shoulder locations.

The shoulder strap section has right and left shoulder strap portions extending over right and left shoulders of the person, and having rear ends connected to the upper ends of the right and left back strap portions.

The front strap section has right and left front strap portions having upper and lower front strap ends, with the upper front strap ends connecting to the front ends of the shoulder strap portions, and with the front strap portions extending downwardly and rearwardly. The lower ends of the front strap portions connect to the pouch at forward side connecting locations on the pouch. The front strap portions exert upwardly and forwardly directed force components from the connecting locations of the pouch to the forward ends of the shoulder strap portions.

There is a waist strap having rear ends connecting to respective side portions of the pouch, and front ends connecting to one another so that the waist strap extends around the waist of the person in a manner to exert right and left forward force components on the pouch.

The pouch, the shoulder strap assembly and the waist strap portions are configured and sized, relative to a person's body in a manner that:

i. the front panel of the pouch is positioned against the lower back area of the person;

ii. the waist strap extends around the person's body at a waist location thereof;

iii. the lower connecting ends of the front strap portions connect to the pouch at sides of the person's lower back area;

Thus, the pouch is located and supported by:

i. vertical force components that are reacted into the pouch along a vertical axis positioned at a central location between the side portions and between the front and rear panels of the pouch;

ii. forward force components reacted at side locations and central locations of the pouch Thus, the pouch is positioned, held and supported to remain at substantially the same position relative to the person's body and thus closely follows movements of the person's body.

In the preferred form, the back strap portion comprises a lower central back strap connected to the pouch. Extending upwardly and forwardly and connecting at the upper end thereof to lower ends of the right and left back strap portions which then extend forwardly, upwardly and outwardly to the right and left shoulder locations. Desirably, the lower back strap portion has lengthwise adjusting means to properly position the lower end connection of the pouch relative to the shoulder strap portions. Also, desirably, the right and left back strap portions have length adjusting means relative to the lower central back strap portions and to the shoulder strap portions.

Further, in the preferred form the front strap portions have lengthwise adjustment means relative to the shoulder strap portions and their connecting locations to the pouch to properly locate outside forward portions of the pouch relative to the shoulder strap portions.

Also, in the preferred form, there are right and left auxiliary waist straps, each extending from a related upper front side connecting location of the pouch downwardly and forwardly to connect to the waist strap at a location forward from the connecting location of the waist strap portions to the pouch. Also, desirably, the right and left auxiliary straps have lengthwise adjusting means.

In the method of the present invention, the backpack is provided as indicated above. The carrying pouch is positioned, and the strap assembly arranged as described above. With this being done, the force components resulting from the gravitational forces acting on the pouch are reacted with the vertical force components and the horizontal force components reacting so that the pouch is positioned, held and supported to maintain the pouch at substantially the same position relative to the person's body and thus closely follow movements of the person's body.

Other features of the present invention will become apparent from the following detailed description.

DESCRIPTION OF THE PREFERRED EMBODIMENTS

Figure 1:
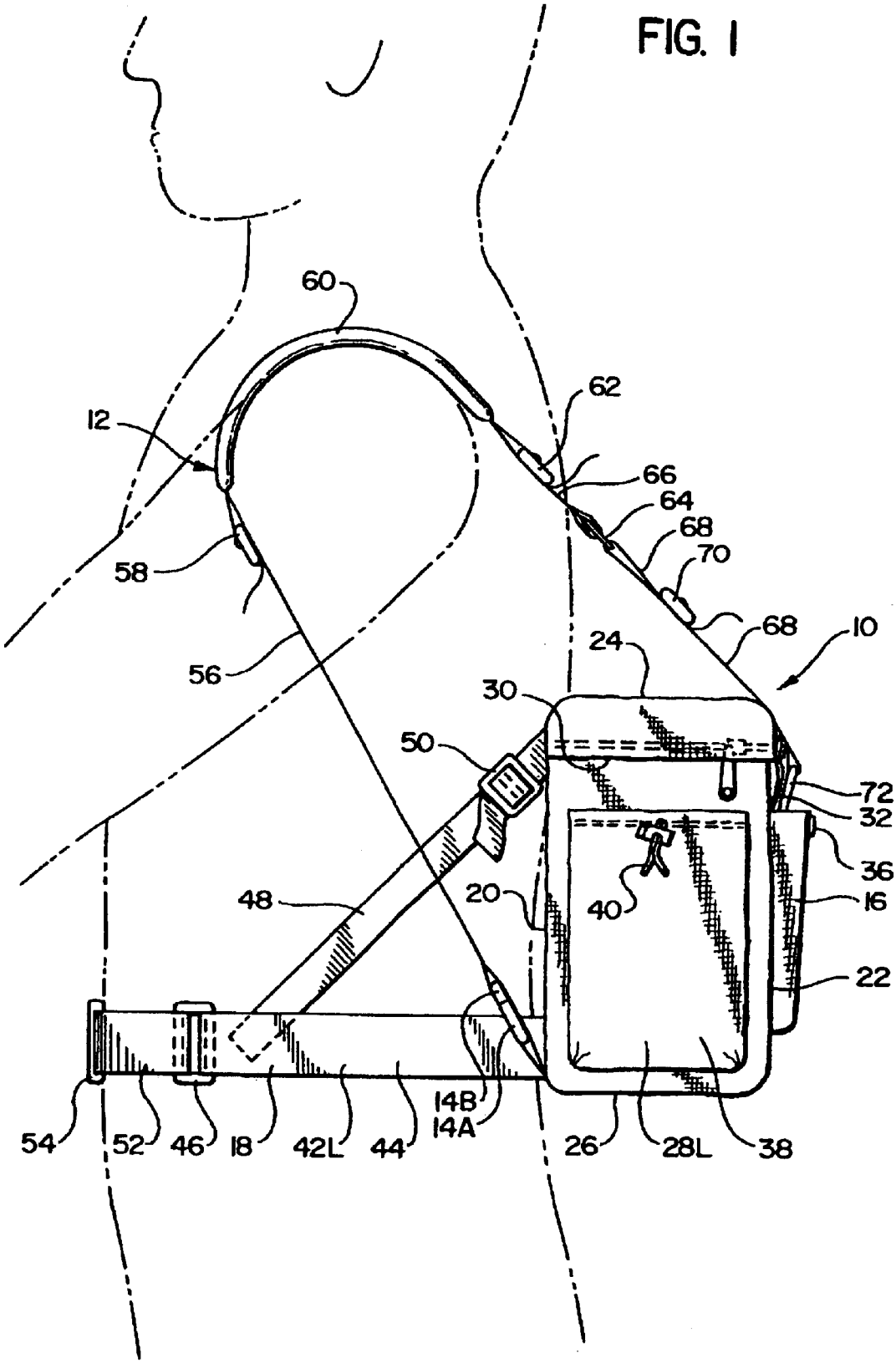
FIG. 1 is a side elevational view showing a preferred embodiment of the back pack of the present invention being carried by a hiker in its preferred operating position.

As illustrated in FIG. 1, the illustrated preferred embodiment of the present invention comprises a frameless version of a backpack 10 which comprises a pouch or bag forming portion 11. Attached to the central rear panel portion of the pouch 11 is a shoulder strap assembly 12, with clips 14b on detachable ends. The pouch 11 has a rear pocket 16 for carrying the shoulder straps. There is a waist-encircling belt 18.

The bag-forming portion of pouch 10 of the pack is more or less conventional comprising a front panel 20, a rear panel 22, a top panel 24, and one panel 26 forming the bottom, and sidewalls 28R and 28L, all made of heavy fabric and sewn together to form a top-opening receptacle or bag. An upper zippered opening 30 (FIG. 2) extends across upper edges of the rear panel 22 and along edges of both sidewalls 28R and 28L. A small flap 32 with one part 34 of a two-part fastener attached to it, for example by stitching, provides closure means for the rear pocket 16 which has the other part 36 of the fastener attached to it. In the particular form shown, this fastener comprises one of the "loop-and-pile" type although other two-part fasteners could be substituted therefor.

Figure 2:
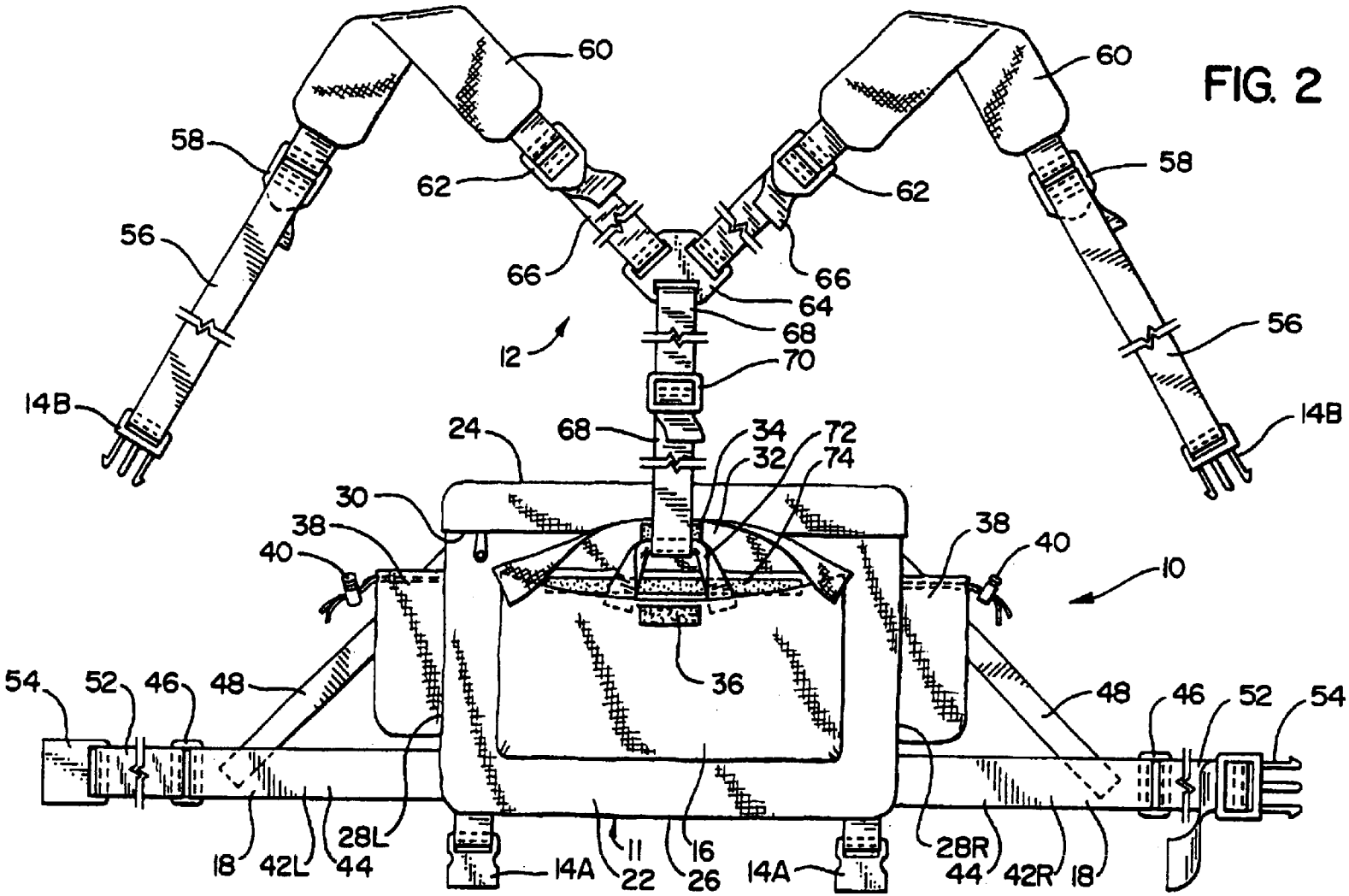
FIG. 2 is a rear elevational view of the pack showing the various straps extending away from the back pack.

Each sidewall 28R and 28L also includes a pocket 38 with a drawstring closure 40 which can be used to hold water-bottles or any number of varied objects such as sunglasses, or scarves. As seen in FIGS. 1 and 2, the waist belt 18 comprises two sections 42R and 42L, which are substantially identical in construction and function. It should be mentioned that the designations "R" and "L" referring respectively to "right" and "left" have been used to refer to the pack as seen in elevation in FIG. 2, as the wearer would see it with his or her back to the pack. Thus the belt section 42L will be on the wearer's left side as shown. Each section of the belt 42R and 42L is comprised of several parts. Attached, for example by stitching, to each lower, side corner of the front panel 20 is a waist belt strap section 44 which is constructed of a wide piece of heavy nylon webbing having at its' terminus a "D" ring 46. Where each strap section 44 attaches to the front panel 20 one half 14a of a two part fastener 14A/14B is also attached, for example by stitching, to the front panel 20. In the particular form shown, each fastener 14A/14B comprises one of the "quick-release" buckle type, although other two-part fasteners could be substituted therefore. This fastener part 14A forms the attachment point for the shoulder strap assembly 12 which has at its' two terminus locations the other fastener parts 14B. Sewn to the terminus end of the strap section 44 of the belt strap 42L is a narrow piece of nylon webbing 48, the free end of which passes through an adjustable buckle 50 which is attached, for example by stitching, to the top, side corner of the front panel 20. Another piece of wide nylon webbing 52 is attached to the "D" ring 46 and the free end of the strap passes through one half of a two part adjustable buckle 54 of the quick release type. The other belt strap 42R is similarly constructed.

Looking at FIGS. 1 and 2 it will be seen that the adjustable shoulder strap assembly 12 comprises ten parts. The front straps or connector belts 56, which in the preferred embodiment are made of nylon webbing, have one half 14B of a two part quick release buckle at their terminus for attachment to the other half 14A of the quick release buckle which is attached (as indicated previously), for example by sewing, to the front panel 20 of the bag forming portion of the pack. The other end of each strap 56 passes through an adjustable buckle 58 which is attached, for example by stitching, to the shoulder pad 60. The shoulder straps or pads 60 have a foam core and a stitched nylon cover with adjustable buckles 58 and 62 attached, for example by stitching, to each end. The shoulder pads 60 are connected to a crossover strap divided 64 by slanted back straps 66, each made as a length of nylon webbing, one end of which is attached, for example by stitching, to the crossover strap divider 64 and the other end passes through the adjustable buckle 62 at the rear acing end of the shoulder strap or pad. The strap divider 64 is connected to a vertical back strap support member 68 which is made of a non-stretchable flexible material and is longitudinally adjustable, for example, with a slider bar 70. The rear vertical support member 68 is attached at its lower end, for example by stitching, at the middle of a piece of nylon webbing 72, both ends of which are fastened, for example by stitching, to the rear panel 22 and located in the pocket 16. When the straps are in their operational deployment mode additional closure means for the pocket 16 is provided by a two part fastener 74. In the particular form shown this fastener comprises one of the "loop and pile" type although other two part fasteners could be substituted therefore. All materials and attachments means in the above mentioned parts are described in terms of their preferred embodiments, and it is realized that some or all of these specifics could be changed without substantially altering the design or function of the invention.

Figure 3:
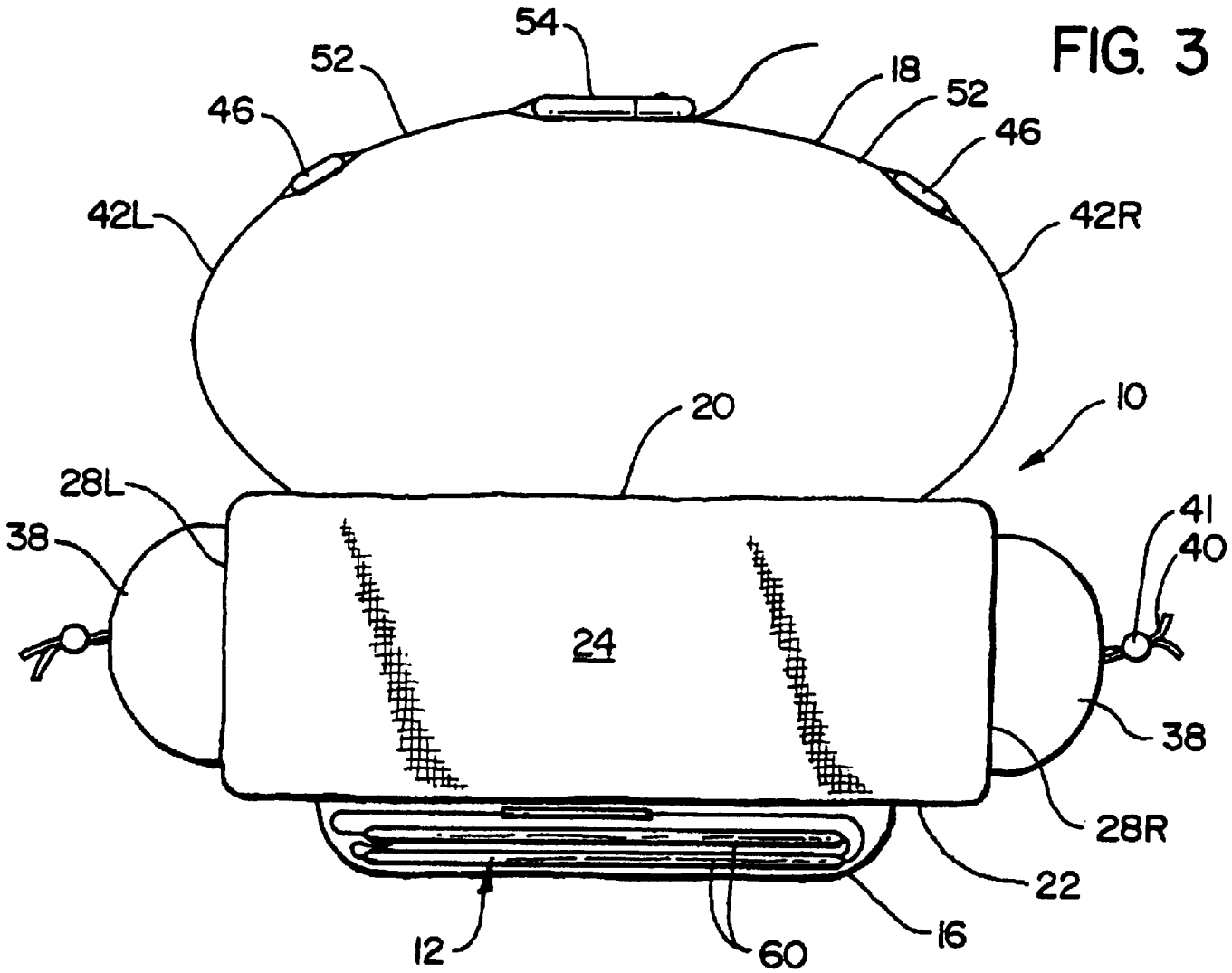
FIG. 3 is a view looking downwardly on the back pack, showing the shoulder strap and back strap sections stowed in a rear pocket of a pouch, and with the top portion of the pouch having been broken away to more clearly reveal the interior construction.

FIG. 3 shows the strap assembly 12 in the pocket 16 where it is stored when not in use. The pocket 16 is in the form of a small envelope with an opening at the top, a flap 32 (not shown in this view) for closure and a two part fastener of the loop and pile type 34 and 36 (also not shown) for securing the flap 32 to the pocket 16. The length and width of the envelope is selected such that the entire strap assembly will easily fold-up and be confined therein as shown in FIG. 3. As indicated previously, the pouch 11 of a backpack 10 usually has its lower forward edge portion at or slightly below the waist location of the person, and the top panel 24 is generally in the area of or below, the intermediate back location. Further, the pouch extends substantially across (or at least nearly all the way across) the lower portion of the person's back.

In general, the width dimension (shown at "w" in FIG. 7) of the pouch would be between about ⅔rd of a foot to one foot in width. The height of the family pack (shown at "h" in FIG. 5) is generally between about one quarter of a foot to possible one half of a foot on the low side, and approximately a foot on the high side. The forward to rear depth dimension (shown at "d" in FIG. 5) would be between about a quarter of a foot to possibly a half of a foot.

For example, one commercially available relatively small fanny pack has a width dimension of ten inches, a height dimension of five inches and a forward to rear depth dimension of three inches. A relatively large commercially available fanny pack was found to be eleven and one half inches wide, twelve inches high, and had a forward to rear depth dimension of four and one half inches. In measurements made of commercially available fanny packs, the maximum to minimum range of the dimensions of the pouches were found to be as follows:

Width dimension between about eight inches to thirteen inches;

Height dimension between about five inches to twelve inches;

Forward to rear depth dimension between about three inches to five inches.

One of the significant features of the present invention is the manner in which the shoulder strap assembly 12 and the waist belt 18 function with the back pack pouch or bag forming portion 11 in advantageously reacting the force components into the person's body. This will be explained with references to FIGS. 4 through 7.

Figure 4:
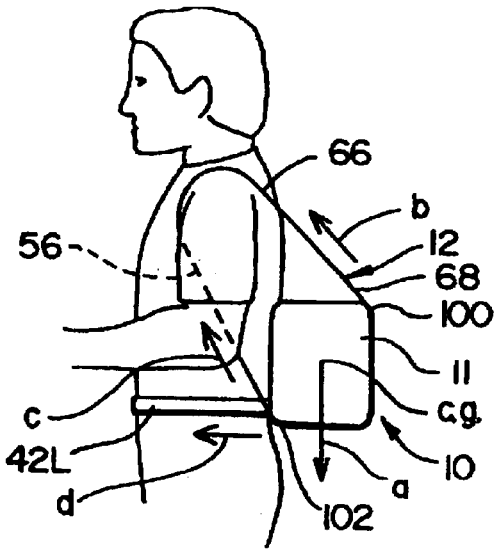
FIG. 4 is a somewhat schematic side elevational view illustrating certain force components which result in the use of the back pack of the present invention.

As can be seen in FIG. 4, the back pack 10 has a downward gravitational force "a" which can be considered as acting at the center of gravity "c.g." of the pouch 11.

The downward gravity force component is resisted in part by the strap 68 which exerts an upwardly and forwardly slanted force component indicated at "b" exerted at a rear middle location 100 on the pouch 11. In addition, the forward front connector belts 56 exert upward and forward force components indicated at "c". With the two force components "c" being exerted at lower, forward outside corner portions 102 of the back pack 10. The two waist belt sections 42L and 42R (only 42L being shown herein), exert on the backpack forward force component "d" exerted at the lower, front corner locations of the pouch 11.

Figure 5:
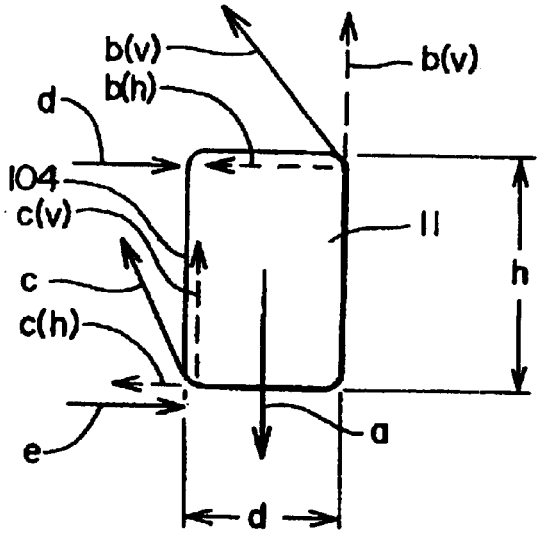
FIG. 5 is a view only of the back pack, again illustrating certain force components.

Reference is now made to FIG. 5, which for clarity of illustration, shows only the main pouch 11 and the force components exerted thereon. It will be noted that the upward and forward force component "b" can be broken up into two vectors, namely a vertical vector b (v), and a horizontal b (h). In like manner, the two force components "c" can be divided into a vertical vector component c (v), and a horizontal vector component c (h).

The two vertical vector components c (v) of the two front straps 56 and the third vertical vector component b (v) substantially balance with the gravity force component "a". The three horizontal vector components b (h) and the two c (h) vector components result in a net forward force which must be reacted into the person's body, and more specifically into the person's lower back portion.

Accordingly, there is shown in FIG. 5 an upper horizontally directed force component "d" exerted by the middle back portion of the person against the pouch 11. There also are shown two rearwardly oriented force components "e" which are directed by side portions of the person's body against portions of the back pack along the lower portion thereof.

It is to be understood, of course, that the upper force component "d" is not necessarily directed at one small location, but is directed into the pouch 11 along the entire area of contact with the person's back with the pouch 11. In like manner, while the force vectors c (h) are directed at lower outside corner locations of the pouch 11, the counteracting force "c" is directed along the entire lower contact portion of the pouch 11 with the person's back.

Figure 6:
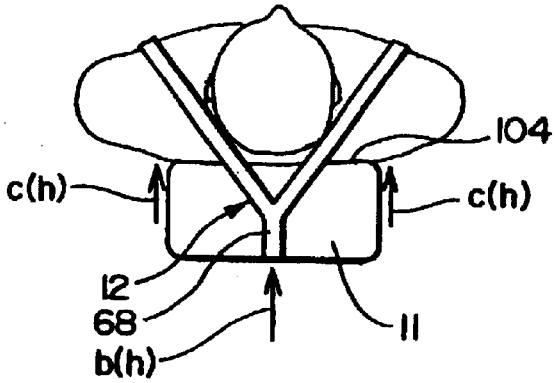
FIG. 6 is a top plan view, looking down on the person wearing the back pack and again illustrating certain of the force components.

Reference is now made to FIG. 6, which is a top view to illustrate the areas of applications of the horizontally and forwardly directed force components. It can be seen that the horizontal component b (h) is directed at a center location where the middle back strap 68 connects to the pouch 11. In like manner the other two force components c (h) are directed essentially at laterally spaced locations. The effect of this is that the lateral forces exerted between the pouch 11 and the person's back are exerted along the entire surface 104 extending substantially all the way from the side edges of the pouch 11. Thus, when the person moves so as to turn his body about a vertical axis, the pouch 11 is held snugly against the person's back. This gives the effect of the pouch 11 being closely secured to (and thus as a part of) the person's lower back portion.

Figure 7:
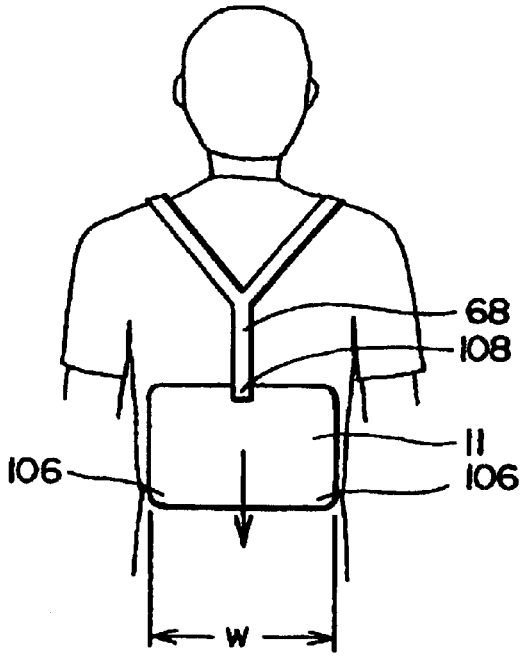
FIG. 7 is a rear view of a person wearing the back pack, and again illustrating the force components.

Now reference is made to FIG. 7. This shows the two lower side edge locations 106 where the force components c (h) are exerted. The upper horizontal force component b (h) is exerted at the point 108. It can be seen that these points 106 and 108 at which these force components b (h) and c (h) are exerted actually are in the form of a triangle. The effect of this is that both upper, lower and middle portions of the pouch 11 are pressed against the person's lower back. This further enhances the feeling of the pouch 11 both laterally and vertically being pressed against the person's back to in a sense give the sensation of being part of the person's body.

On conventional packs the downward gravity force component is resisted by use of a waist belt, and shoulder straps, both of which attach to the front edge of the pouch or carrying portion on the same plane as the wearer's back. Resisted in it's primary vertical vector, downward, the gravitational component exerts itself as a rearward slanted force component, tilting the pack away from the wearer's body. Typically this gravitational vector is countered by the wearer tilting their body forward so that the primary vertical gravitational force reacts the pouch into their body because they have placed their back between the gravitational vector and the ground by bending their body. This is not the most comfortable nor ergonomically correct way to carry a load.

By way of contrast the chief design benefit of the presently contemplated invention is obtained from the attachment of the straps 68 of the strap assembly 12 to the rear panel 22 of the bag or pouch 11 and the front straps 56 of the shoulder strap assembly 12 at the forward end. Attaching strap assembly 12 to the rear panel 22 exerts an upward and forwardly slanted force component which traps the load against the body and prevents its tilting away from the wearer's center of gravity. This benefit increases proportionately to the amplification of vector forces caused by the vigorous movement associated with activities such as skiing and mountain hiking.

It is apparent from the foregoing that a novel and unobvious pack has been provided which allows for a high degree of versatility in configuring the manner in which it is employed as well as allowing for quick and easy adjustment to fit a wide variety of bodies. This pack fills a previously unmet need of allowing people to carry heavier loads in a highly stable manner with a hitherto unknown degree of comfort while maintaining an excellent, unencumbered range of movement, and an upper back which is free to respire freely.

While this invention has been described in terms of a preferred embodiment, it is contemplated that persons reading the preceding description and studying the drawing will realize various alterations, permutations and modifications thereof. It is therefore intended that the following appended claims be interpreted as including all such alterations and modifications as fall within the true spirit and scope of the present invention.

What is claimed:

1. A backpack for carrying a load on a back of a person's body, the person's back having an upper back area and a lower back area, and also having i. a lower back location proximate to of the person's waist;

ii. an upper back location approximately just below the height of the person's shoulders;

iii. an intermediate back location positioned generally at a juncture area of said upper and lower back areas;

iv. right and left shoulder locations;

v. a waist location;

said backpack comprising:

a. a carrying pouch defining therein a load carrying area, said pouch having front and rear panel portions, side portions, and top and bottom portions, said front and rear panel portions being located forwardly and rearwardly, respectively, of a longitudinal axis of said pouch;

b. a shoulder strap assembly which in use comprises:

i. a back strap section having a lower end connecting at a central rearwardly location of said longitudinal axis of the pouch and engaging at least an upper rear central location thereof, so as to extend upwardly and forwardly therefrom to exert both upward and horizontal force components from said upper rear central location, said back strap section comprising right and left back strap portions which extend forwardly, upwardly and outwardly over the upper back area to the right and left shoulder locations to exert right and left force components directed from said lower end connection upwardly, outwardly and forwardly to said right and left shoulder locations;

ii. a shoulder strap section having right and left shoulder strap portions extending over right and left shoulders of the person, and having rear ends connected to upper ends of said right and left back strap portions;

iii. a front strap section having right and left front strap portions having upper and lower front strap ends, with the upper front strap ends connecting to front ends of the shoulder strap portions, and with the front strap portions extending downwardly and rearwardly with lower ends thereof connecting to said pouch at forward side connecting locations on said pouch, and with said front strap portions exerting upwardly and forwardly directed force components from the connecting locations of the pouch to the forward ends of the shoulder strap portions;

c. left and right waist portions each having rear ends connecting to respective side portions of the pouch, front ends connecting to one another so that said waist strap portions extend around the waist of a person in a manner to exert right and left forward force components on the pouch;

d. said pouch, said shoulder strap assembly and said waist strap portion being configured and sized relative to the person's body in the manner that:

i. both upper and lower portions of the front panel of the pouch are positioned against the back of the person with the upper portion of the front panel being positioned up to approximately no higher than approximately said intermediate back location;

ii. the waist strap extends around the person's body at a waist location thereof;

iii. the lower connecting ends of the front strap portions connect to the pouch at sides of the person's lower back area;

so that the pouch is located and supported by:

i. vertical force components reacting relative to said pouch along a vertical axis positioned at a central location between the side portions and between the front and rear panels of the pouch;

ii. forward force components reacting at side locations and at an upper central location of the pouch;

whereby the pouch is positioned, held and supported to remain at substantially the same position relative to the person's body and thus closely follows movements of the person's body.

2. The backpack as recited in claim 1, wherein said backstrap section comprises a lower central back strap portion connected to the pouch, extending upwardly and forwardly, and connecting at an upper end thereof to lower ends of said right and left back strap portions which then extend forwardly, upwardly and outwardly to the right and left shoulder locations.

3. The backpack as recited in claim 2, wherein said lower central back strap portion has lengthwise adjusting means to properly position the lower central back strap portion relative to the shoulder strap portions.

4. The backpack as recited in claim 3, wherein of the right and left back strap portions have length adjusting means for adjusting the length thereof.

5. The backpack as recited in claim 4, wherein the front strap portions have lengthwise adjustment means located relative to the shoulder strap portions and their connecting locations to the pouch, to properly locate outside forward portions of the pouch relative to the shoulder strap portions.

6. The backpack as recited in claim 2, wherein the back strap section and the front strap section both have vertical adjustment means relative to the shoulder strap section, whereby the pouch and the shoulder straps can be properly positioned with appropriate length dimensions of the back strap section and the front strap section.

7. The backpack as recited in claim 1, wherein the back strap section and the front strap section both have vertical adjustment means relative to the shoulder strap section, whereby the pouch and the shoulder straps can be properly positioned with appropriate length dimensions of the back strap section and the front strap section.

8. The backpack as recited in claim 1, wherein the lower ends of the front strap portions connect to said pouch each at a lower side front location of the pouch.

9. The backpack as recited in claim 8, wherein there are right and left auxiliary waist straps, each extending from a related upper front side connecting location of said pouch downwardly and forwardly to connect to the waist strap at a location forward from the connecting location of the waist strap portions to the pouch.

10. The backpack as recited in claim 9, wherein said right and left auxiliary straps have lengthwise adjusting means.

11. The backpack as recited in claim 1, wherein said pouch has a maximum height dimension of between about one quarter of a foot to one foot, and a forward to rear depth dimension between one quarter of a foot to one half of a foot.

12. The backpack as recited in claim 11, wherein said backpack has a horizontal width dimension between about two thirds of a foot to one foot.

13. The backpack as recited in claim 11, wherein said height dimension is between about five inches to twelve inches, and said forward to rear depth dimension is between about three inches to five inches.

14. The backpack as recited in claim 13, wherein said backpack has a horizontal width dimension between about eight inches to thirteen inches.

15. A method of utilizing a backpack for carrying a load on a back of a person's body, the person's back having an upper back area and a lower back area, and also having i. a lower back location proximate to the person's waist;

ii. an upper back location approximately just below the height of the person'shoulders;

iii. an intermediate back location positioned generally at a juncture area of said upper and lower back areas;

iv. right and left shoulder locations;

v. a waist location;

a. providing a carrying pouch of said backpack defining therein a load carrying area, said pouch having front and rear panel portions, side portions, and top and bottom portions, said front and rear panel portions being located forwardly and rearwardly, respectively, of a longitudinal axis of said pouch;

b. providing a shoulder strap assembly to carry said pouch as follows:

i. providing a back strap section and connecting a lower end of said back strap section at a central location rearwardly of said longitudinal axis of the pouch so as to engage at least an upper rear central location thereof and to extend upwardly and forwardly therefrom to exert both upward and horizontal force components from said upper rear central location, and positioning right and left back strap portions of said back strap section to which extend forwardly, upwardly and outwardly over the upper back area to the right and left shoulder locations to exert right and left force components directed from said lower end connection upwardly, outwardly and forwardly to said right and left should locations;

ii. providing and positioning a shoulder strap section having right and left shoulder strap portions to extend over right and left shoulders of the person, with rear ends of said shoulder strap portions connected to upper ends of said right and left back strap portions;

iii. providing and positioning a front strap section having right and left front strap portions having upper and lower front strap ends, with the upper front strap ends connecting to front ends of the shoulder strap portions, and with the front strap portions extending downwardly and rearwardly with lower ends thereof connecting to said pouch at forward side connecting locations on said pouch, and with said front strap portions exerting upwardly and forwardly directed force components from the connecting locations of the pouch to the forward ends of the shoulder strap portions;

c. providing and positioning right and left waist strap portions, each having rear ends connecting to respective side portions of the pouch, and front ends connecting to one another so that said waist strap portions extend around the waist of the person in a manner to exert right and left forward force components on the pouch;

d. positioning said pouch, said shoulder strap assembly and said waist strap portion relative to the person's body in the manner that:

i. both upper and lower portions of the front panel of the pouch are positioned against the back of the person with the upper portion of the front panel being positioned up to no higher than approximately said intermediate back location;

ii. the waist strap extends around the person's body at a waist location thereof;

iii. the lower connecting ends of the front strap portions connect to the pouch at sides of the person's lower back area, so that the pouch is located and supported by:

i. vertical force components reacting relative to said pouch along a vertical axis positioned at a central location between the side portions and between the front and rear panels of the pouch;

ii. forward force components reacting at side locations and at an upper central location of the pouch;

whereby the pouch is positioned, held and supported to remain at substantially the same position relative to the person's body and thus closely follows movements of the person's body.

16. The method as recited in claim 15, wherein said backstrap section comprises a lower central back strap portion connected to the pouch, extending upwardly and forwardly, and connecting at an upper end thereof to lower ends of said right and left back strap portions which then extend forwardly, upwardly and outwardly to the right and left shoulder locations.

17. The method as recited in claim 15, wherein the lower ends of the front strap portions connect to said pouch each at a lower side front location of the pouch.

18. The method as recited in claim 17, wherein there are right and left auxiliary waist straps, each extending from a related upper front side connecting location of said pouch downwardly and forwardly to connect to the waist strap at a location forward from the connecting location of the waist strap portions to the pouch.

19. The method as recited in claim 15, wherein said pouch has a maximum height dimension of between about one quarter of a foot to one foot, and a forward to rear depth dimension between one quarter of a foot to one half of a foot.

20. The method as recited in claim 19, wherein said backpack has a horizontal width dimension between about two thirds of a foot to one foot.

* * * * *